US006576472B1

(12) United States Patent
Geysen

(10) Patent No.: US 6,576,472 B1
(45) Date of Patent: Jun. 10, 2003

(54) CHEMICAL CONSTRUCTS FOR SOLUTION PHASE CHEMISTRY

(75) Inventor: H. Mario Geysen, Chapel Hill, NC (US)

(73) Assignee: Smithkline Beecham Corporation, Philadelphia, PA (US)

( * ) Notice: Subject to any disclaimer, the term of this patent is extended or adjusted under 35 U.S.C. 154(b) by 89 days.

(21) Appl. No.: 09/625,782

(22) Filed: Jul. 26, 2000

(51) Int. Cl.[7] .................... G01N 30/02

(52) U.S. Cl. .................... 436/161; 436/8; 436/514

(58) Field of Search .................... 436/161, 8, 538, 436/541, 547, 156, 514; 435/6, 4, 5

(56) References Cited

U.S. PATENT DOCUMENTS

| | | | | | |
|---|---|---|---|---|---|
| 5,463,564 | A | | 10/1995 | Agrafiotis et al. | 364/496 |
| 5,549,974 | A | | 8/1996 | Holmes | 428/403 |
| 5,574,656 | A | | 11/1996 | Agrafiotis et al. | 364/500 |
| 5,684,711 | A | | 11/1997 | Agrafiotis et al. | 364/500 |
| 5,741,927 | A | * | 4/1998 | Parker et al. | 562/486 |
| 5,770,358 | A | | 6/1998 | Dower et al. | 435/6 |
| 5,948,624 | A | * | 9/1999 | Rothschild et al. | 435/6 |
| 5,969,348 | A | * | 10/1999 | Franzen | 250/282 |

FOREIGN PATENT DOCUMENTS

| | | |
|---|---|---|
| GB | 2 304 410 | 3/1997 |
| WO | WO 94/08051 | 4/1994 |
| WO | WO 95/28640 | 10/1995 |
| WO | WO 96/30392 | 10/1996 |
| WO | WO 97/08190 | 3/1997 |
| WO | WO 97/14814 | 4/1997 |
| WO | WO 97/37953 | 10/1997 |

OTHER PUBLICATIONS

Geysen, H.M. et al., "Isotope or mass encoding of combinatorial libraries," *Chemistry & Biology,* Aug. 1996, vol. 3, No. 8, pp. 679–688.

Larock, R., "A Guide to Functional Group Preparations," *Comprehensive Organic Transformations,* VCH Publishers, Inc., 1989, pp. xiii–xxviii.

Lutz–Friedjan, T, et al., *Reactions and Snytheses In the Organic Chemistry Laboratory,* University Sceince Books, 1989, p. 50.

Laidler, K. J., *Chemical Kinetics,* HarperCollinsPublishers, Inc., 1987, p. 22.

Willoughby, R. et al., *A Global View of LC/MS How to solve your most challenging analytical problems,* Global View Publishing, 1998, First Edition, pp. 287–293.

Greene, T. W., *Protective Groups in Organic Synthesis,* John Wiley & Sons, Inc., Second Edition, 1991, pp. 1–4, xi–xvi.

* cited by examiner

*Primary Examiner*—Jill Warden
*Assistant Examiner*—Sam P. Siefke
(74) *Attorney, Agent, or Firm*—Frank P. Grassler

(57) ABSTRACT

A chemical construct for use with solution phase chemistry comprises a reversible attachment unit and one or more attribute conferring units. Such units may include separation attribute conferring units, identification attribute conferring units, and quantitation attribute conferring units.

10 Claims, 5 Drawing Sheets

CHEMICAL CONSTRUCTS FOR SOLUTION PHASE CHEMISTRY

BACKGROUND OF THE INVENTION

This invention is related to the field of chemistry, and particularly to solution phase chemistry. More specifically, the invention relates to chemical constructs that may be used with solution phase chemistries.

Modern chemistry is a mature discipline that utilizes a variety of procedures. For example, one common procedure is the reaction of various components under suitable conditions to produce one or more products. Another procedure is the protection of potentially labile functionality present in the material prior to carrying out a reaction or process on the material. A further procedure is the separation of wanted materials from unwanted materials, either after a reaction or from complex raw materials. Still another procedure is the identification of one or more of the components present after carrying out a reaction, or of the components of a solution of raw materials. Yet another procedure is the quantitation or measurement of the relative or absolute amount of materials of one or more of the components of a solution.

The choice of a particular procedure often depends on the properties of the material in question. For example, the material may be non-charged, making accurate detection by mass spectroscopy difficult, if not impossible. As another example, if the material is a poor chromophore, spectroscopic monitoring of the material throughout a process may be impractical. As still another example, if a desired material has properties similar to other components in a solution, separation of the desired material from the other components may be difficult.

It is also often the case that because of the difficult and time-consuming nature of the separation and/or purification steps required to produce an acceptable quality of reaction product, large molar excesses of one or more of the reactants is avoided. The addition of large molar excesses to drive a reaction to completion by the law of mass action is well known to chemists and extensively used when chemistry is carried out on a solid-phase. Therefore by an enhancement of the ability to purify or separate a reaction product from other reaction components, larger excesses of reactants or reagents, to drive reactions to completion, could be used more often when carrying out chemistries in solution-phase.

Hence, even though modern chemistry is a mature discipline, improvements to such procedures are continually sought. Hence, this invention is related to techniques for improving one or more of the above procedures, among others.

SUMMARY OF THE INVENTION

The invention provides chemical constructs for solution phase chemistries to facilitate the separation, identification and/or quantitation of a chemical component or material. In one embodiment, such a chemical construct comprises a module having a reversible attachment unit that permits the module to be reversibly attached to the chemical component. The module further includes one or more attribute conferring units, such as separation attribute conferring units, identification attribute conferring units, and quantitation attribute conferring units. Such attribute conferring units may be used in any number or combination. In one aspect, the reversible attachment unit comprises a chemical functionality that is chemically attachable to a chemical component in a solution in such a way that the chemical component may be removed from the attachment unit in a subsequent chemical step while the chemical component remains unchanged or changed to another chemical component of utility.

A wide variety of separation attribute conferring units may be used. For example, the separation attribute-conferring unit may be configured to differentially precipitate the chemical component/construct combination away from other materials in the solution. Alternatively, the separation attribute-conferring unit may be configured to differentially crystallize the chemical component/construct separately from other materials in the solution. As another example, the separation attribute-conferring unit may comprise a charged group to facilitate the separation of the chemical component/construct differentially from non-charged materials in the solution when used with ion exchange chromatography. As still another example, the separation attribute-conferring unit may be sized to make the chemical component/construct larger in size than other components in the solution when used with size exclusion chromatography. In one particular example, the separation attribute conferring unit may comprise an affinity component to provide the chemical component/construct with an affinity for a complementary support that is different than for other components in the solution when used with affinity chromatography. As a further example, the separation attribute-conferring unit may comprise a solubility component to make the chemical component/construct differentially soluble in a particular solvent relative to other components to permit phase extraction separation of the chemical component. As yet another example, the separation attribute conferring unit may comprise a physical characteristic selected to favor separation of the chemical component/construct by a separation process such as thin layer chromatography, two dimensional gel separation, gas chromatography, capillary electrophoresis, membrane separation or the like.

In one particular aspect, the identification attribute-conferring unit may comprise an ionizable chemical group that is adapted to facilitate identification of the chemical component/construct in a mass spectrometer. As an alternative, the identification attribute-conferring unit may comprise an isotopic mass peak splitter to facilitate identification of the chemical component/construct in a mass spectrometer. In another aspect, the identification attribute-conferring unit may comprise a chromophore to permit identification of the chemical component using an optical detector or monitor.

In yet another aspect, the quantitation attribute conferring unit may comprise a reference material that is quantitatively related to the amount of the chemical component. In this way, the amount of chemical component may be determined using a mass spectrometer.

In another embodiment, the invention provides a method for evaluating and/or processing a reaction product contained in a solution. According to the method, a module is reversibly attached to a first chemical component. The module comprises a reversible attachment unit that reversibly attaches the module to the first chemical component, and one or more attribute conferring units, such as separation attribute conferring units, identification attribute conferring units, and quantitation attribute conferring units. The first chemical component is reacted with at least a second chemical component to produce a reaction product. The reaction product may then be separated from any other components in the solution using a separation attribute conferring unit. The reaction product may be identified using an identification attribute conferring unit, and the reaction product may be quantified using a quantitation attribute conferring unit. Hence, the attribute conferring units provide the opportunity to separate, identify and/or quantitate the results of the reaction. At any time in the process, the module may be removed from the reaction product without affecting or changing the reaction product.

One example of a technique that may be used to separate the reaction product from other components in the solution is by precipitating the reaction product in the solution, with the separation attribute conferring unit permitting the reaction product to precipitate differentially from any other components in the solution. As another example, the reaction product may be crystallized, with a separation attribute conferring unit permitting the reaction product to crystallize differentially from any other components in the solution. In another example, the separating step may comprise adding a charge group to the reaction product with a separation attribute conferring unit and separating the reaction product using ion exchange chromatography. As a further example, the separating step may comprise making the reaction product larger in size than the other components in the solution using a separation attribute conferring unit and separating the product using size exclusion chromatography. As still another example, the separating step may comprise providing the reaction product with a certain affinity for a column using the separation attribute conferring unit and separating the reaction product using affinity chromatography. In yet another example, the separating step may comprise providing the reaction product with a certain solubility using a separation attribute conferring unit, and separating the reaction product using reverse chromatography or normal phase chromatography.

In one particular aspect, the reaction product may be identified by ionizing the reaction product using a charged identification attribute conferring unit and placing a sample of the solution in a mass spectrometer. In another aspect, the reaction product may be quantified by using an isotopic mass peak split signature and a reference material that is part of a module. The reaction product is placed into a mass spectrometer and identified by the signature profile produced by the mass spectrometer. The measured signal of the reference material is then compared with the reaction product, and a yield estimated for that product. Alternatively, other techniques that are known in the art may be used to measure the resulting materials, including spectrophotometric methods.

DESCRIPTION OF THE SPECIFIC EMBODIMENTS

Figure 1A:
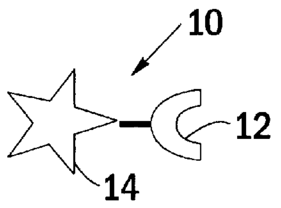
FIG. 1*a* is a schematic diagram of a module having an identification unit coupled to an attachment unit that may be used to facilitate identification of a component according to the invention.

The invention provides the ability to temporarily or reversibly manipulate the properties of a chemical component or material to enhance the properties of the component or material in a given process. Once the process is complete, the enhancement properties may be disengaged or removed to permit recovery of the desired material. For example, one way to reversibly manipulate the properties of the component is to attach a module or a construct to the component to allow one or more procedures to be carried out in a selective manner. The attached module may then be removed to recover the desired component.

The invention will find its greatest use in conjunction with solution phase chemical processes, i.e. processes where one or more chemical components are included within a solution. In such cases, the module may be attached to the component or material by use of an attachment unit. Examples of attachment units that may be used include modified protecting groups to permit linking to the component or material. Protecting groups that may be modified in such a manner are described in Theodora W. Greene and Peter G. M. Wuts, "Protective Groups in Organic Synthesis", John Wiley & Sons, Inc. (1991), the complete disclosure of which is herein incorporated by reference. Such attachment units may be removed from the chemical component or material when desired, thereby permitting the release of the attached module from the desired material. Merely by way of example, a N-tertiary butoxy carbonyl group that is linked to an amine may in the place of a hydrogen atom, molecular entity, to create the attachment unit. A tertiary-butyl carbamate group that is linked to an amine may have a hydrogen atom removed to create the attachment unit. The first chemical formula below illustrates such a group before modification, and is followed by the modified group that is linked to a mass splitting attribute conferring unit, an identification attribute conferring unit and a separation attribute conferring unit (such as, for example, those described hereinafter with reference to FIG. 1*f*).

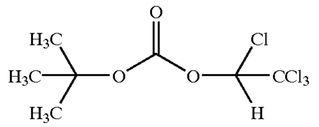

1:1
$C_{12}$:$C_{13}$

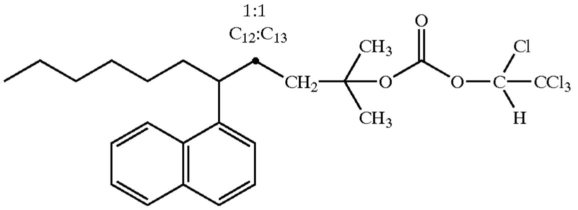

The modules of the invention may include various units to temporarily enhance certain properties of the component to increase the versatility of any processes that may be used in connection with the component, and/or to enhance detection and/or quantitation of the component. For example, one of the units may be used to facilitate the separation of wanted materials from unwanted materials in a solution, either after a reaction or from complex raw materials. As another example, other units may be used to identify one or more components present after carrying out a reaction, or of the components of a solution of raw materials. As still another example, other units may be used to facilitate the quantitation or measurement of the relative or absolute amounts of one or more components of a solution.

Examples of separation techniques that may be used with the invention include differential precipitation where one component is differentially precipitatable relative to other components in a solution, and differential crystallization where one component is differentially crystallizable relative to other components in the solution. Another separation example is the use of charge groups to make the chemical component separable using ion exchange chromatography. One or more chemicals may also be used to make the component separable using size exclusion chromatography. Another separation technique is the use of affinity chromatography where the component has a different affinity for a column relative to other components in a solution, including reverse chromatography and normal phase chromatography. Examples of other phase extraction techniques include phase extraction where the component of interest is made more soluble that other components, thin layer chromatography, two dimensional gel separation, gas chromatography, capillary electrophoresis, membrane separation, and the like.

Techniques that may be used to identify and/or quantify the component of interest include weighing and spectroscopy, including visible light, ultraviolet (UV) light, fluorescence, infrared (IR) light, Ramen, mass spectroscopy, atomic absorption and the like. Other techniques include nuclear magnetic resonance (NMR), elemental analysis, and the like.

The following table is a non-exclusive summary of various separation, quantitation and identification techniques that may be used according to the invention. It will be appreciated to those of skill in the art that other related techniques may be used as well, and the invention is not intended to be limited only to the following examples.

TABLE

| | |
|---|---|
| | Separation Techniques |
| 1. | Differential precipitation |
| 2. | Differential crystallization |
| 3. | Ion exchange chromatography |
| 4. | Affinity chromatography |
| 5. | Size exclusion chromatograph |
| 6. | Phase extraction |
| 7. | Membrane separation |
| 8. | Electrophoresis |
| 9. | 2D gel separation |
| 10. | Thin layer chromatography |
| 11. | Gas chromatography |
| 12. | Normal phase chromatography |
| 13. | Reverse Phase chromatography |
| | Quantitation Techniques |
| 1. | Weighing |
| 2. | Visible/UV/Fluorescence spectroscopy |
| 3. | IR spectroscopy |
| 4. | Raman spectroscopy |
| 5. | Mass spectroscopy |
| 6. | Atomic absorption |
| 7. | NMR |
| 8. | Elemental analysis |
| 9. | Electrolytic |
| 10. | Circular dichroism |
| 11. | ELISA |
| 12. | EPR |
| | Identification Techniques |
| 1. | Visible/UV/Fluorescence spectroscopy |
| 2. | IR spectroscopy |
| 3. | Raman spectroscopy |
| 4. | Mass spectroscopy |
| 5. | Atomic absorption |
| 6. | NMR |
| 7. | Electrolytic |
| 8. | Circular dichroism |
| 9. | ELISA |

Referring now to FIGS. 1*a* through 1*f*, modules having various attribute conferring units that may be used to facilitate separation, identification and/or quantitation of a desired material will be described. In so doing, it will be appreciated that a host of other combinations of attribute conferring units may be used, and that the invention is not intended to be limited to the specific examples of FIGS. 1*a* through 1*f*. For example, the number, order and scope of such attribute conferring units may be varied. For instance, in some cases, a module may include more than one of the same category of attribute conferring unit, e.g. two or more different separation units.

FIG. 1*a* illustrates a module 10 having an attachment unit 12 that is coupled to an identification unit 14. Attachment unit 12 permits module 10 to be reversibly attached to a component or material. In other words, after one or more chemical steps or processes, module 10 may be removed from the desired material while the material remains unchanged. In some cases, the process may be employed to change the material to another material of utility. In such cases, the module may be removed without affecting the new material of utility. Identification unit 14 may be used to identify the material of interest using appropriate measuring equipment that identify based on weight, spectroscopic monitoring, NMR, elemental analysis, and the like.

Figure 1B:
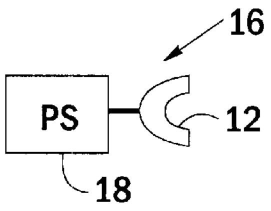
FIG. 1*b* is a schematic diagram of a module having a mass splitting unit coupled to an attachment unit that may be used to facilitate the identification and quantitation of the amount of a component in a solution by mass spectroscopy according to the invention.

FIG. 1*b* illustrates a module 16 having attachment unit 12 coupled to a mass splitting unit 18. Mass splitting unit 18 may be used to facilitate identification and/or quantitation of the amount of a material to which attachment unit 12 is coupled using mass spectroscopy. Examples of mass splitting units are described in, for example, H. Mario Geysen, et al., "Isotope or Mass Encoding of Combinatorial Libraries," Chem. & Biol. Vol. III, No. 8, pp. 679–688, August 1996, and PCT International No. PCT/US97/05701, the complete disclosures of which are herein incorporated by reference.

Figure 1C:
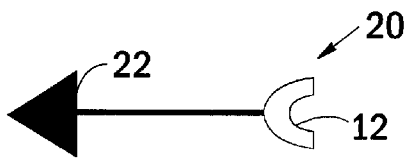
FIG. 1*c* is a schematic diagram of a module having a separation unit coupled to an attachment unit that may be used to facilitate the separation of a particular component according to the invention.

FIG. 1*c* illustrates a module 20 having attachment unit 12 that is coupled to a separation unit 22. Separation unit 22 may be used to facilitate separation of the material attached to attachment unit 12 from other components within a solution using techniques such a phase, filter or size separation. For instance, separation unit 22 may be configured to permit differential precipitation where the separation unit is differentially precipitatable relative to other components in a solution, or to permit differential crystallization where the separation unit is differentially crystallizable relative to other components in the solution. Other examples of separation units include those having a charge group to make the material that is attached to the attachment unit separable from other components in the solution using ion exchange chromatography, and those having one or more chemicals to make the material separable from the other components using size exclusion chromatography. Separation unit 22 may alternatively be configured to have a different affinity for a column relative to other components in a solution. A further example is where separation unit 22 is more soluble that other components in a solution. Further, separation unit 22 may be configured to permit separation from other components in a solution using thin layer chromatography, two dimensional gel separation, gas chromatography, capillary electrophoresis, membrane separation, and the like.

Figure 1D:
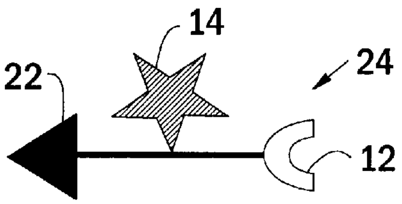
FIG. 1*d* is a schematic diagram of a module having the identification unit and the attachment unit of FIG. 1*a* combined with the separation unit of FIG. 1*c*.

FIG. 1*d* illustrates a module 24 having attachment unit 12, identification unit 14 and separation unit 22. In this way, module 24 may be used to facilitate both identification of the attached material and separation of the attached material from other materials in a solution.

Figure 1E:
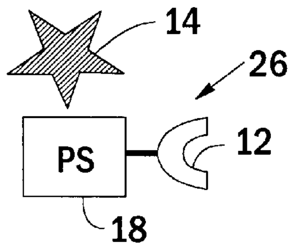
FIG. 1*e* is a schematic diagram of a module having the identification unit and the attachment unit of FIG. 1*a* combined with the mass splitting unit of FIG. 1*d*.

FIG. 1*e* illustrates a module 26 having attachment unit 12, identification unit 14 and mass splitting unit 18. With such units, module 24 may be used to facilitate identification and quantitation using mass spectroscopy.

Figure 1F:
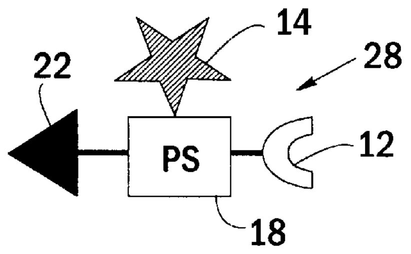
FIG. 1*f* is a schematic diagram of a module having the identification unit and the attachment unit of FIG. 1*a* combined with the mass splitting unit of FIG. 1*b* and the separation unit of FIG. 1*c*.

FIG. 1*f* illustrates a module 28 having attachment unit 12, identification unit 14 mass splitting unit 18 and separation unit 22. In this way, module 28 may be used to facilitate separation, identification and quantitation using mass spectroscopy.

Figure 1G:
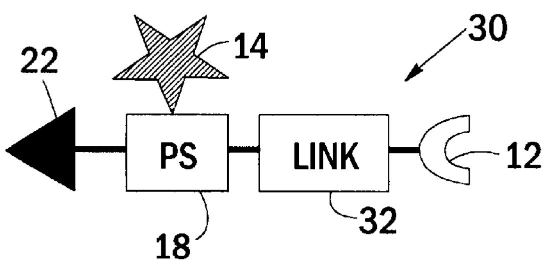
FIG. 1*g* is a schematic diagram of the module of FIG. 1*f* with a chemically, temperature sensitive, or photolytically cleavable linking unit according to the invention.

FIG. 1*g* illustrates a module 30 having all of the units of module 28 along with a linking unit 32. Conveniently, linking unit 32 may be a chemical or photocleavable link. With such a configuration, module 28 may be used to facilitate separation, identification and quantitation. Further, linking unit 20 may be used as a reference material to facilitate the calculation of the yields of a chemical reaction using mass spectroscopy as described hereinafter with reference to FIG. 5 and in copending U.S. patent application Ser. No. 09/625,781, filed on the same date as the present application, the complete disclosure of which is herein incorporated by reference.

Figure 2:
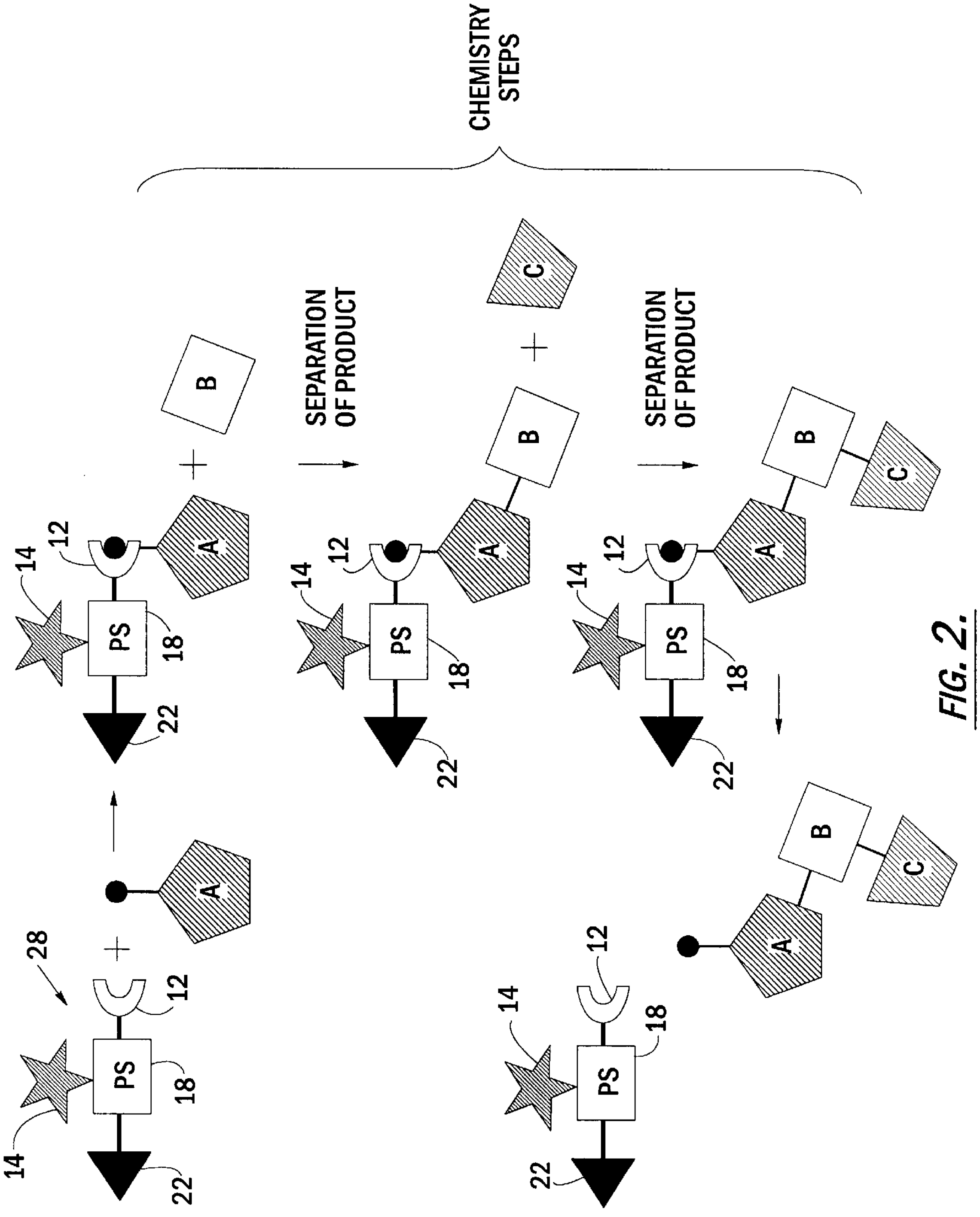
FIG. 2 illustrates one chemical process using the module of FIG. 1*f*.

FIG. 2 illustrates one example of a chemical process that utilizes module 28 of FIG. 1*f*. In an initial step, module 28 is attached to a chemical component A with a reversible attachment using attachment unit 12. Chemical component A is then reacted with a chemical component B to form a reaction product AB. At this point, module 28 may be used to separate reaction product AB from any unreacted B using separation unit 22. Also, module 28 may be used to identify and quantify reaction product AB using identification unit 14 and mass splitting unit 18 using mass spectroscopy. A further chemistry step may be performed where reaction product AB is reacted with a chemical component C to form a reaction product ABC. After this step, any of the steps of separation, identification and/or quantitation may be repeated in a similar manner. At any time, the material coupled to module 28 may be removed by disengaging attachment unit 12. As shown in FIG. 2, reaction product ABC is disengaged from module 28 without affecting the reaction product. Identification of the reaction product may be accomplished by simply separating out module 28 using separation unit 22.

Figure 3:
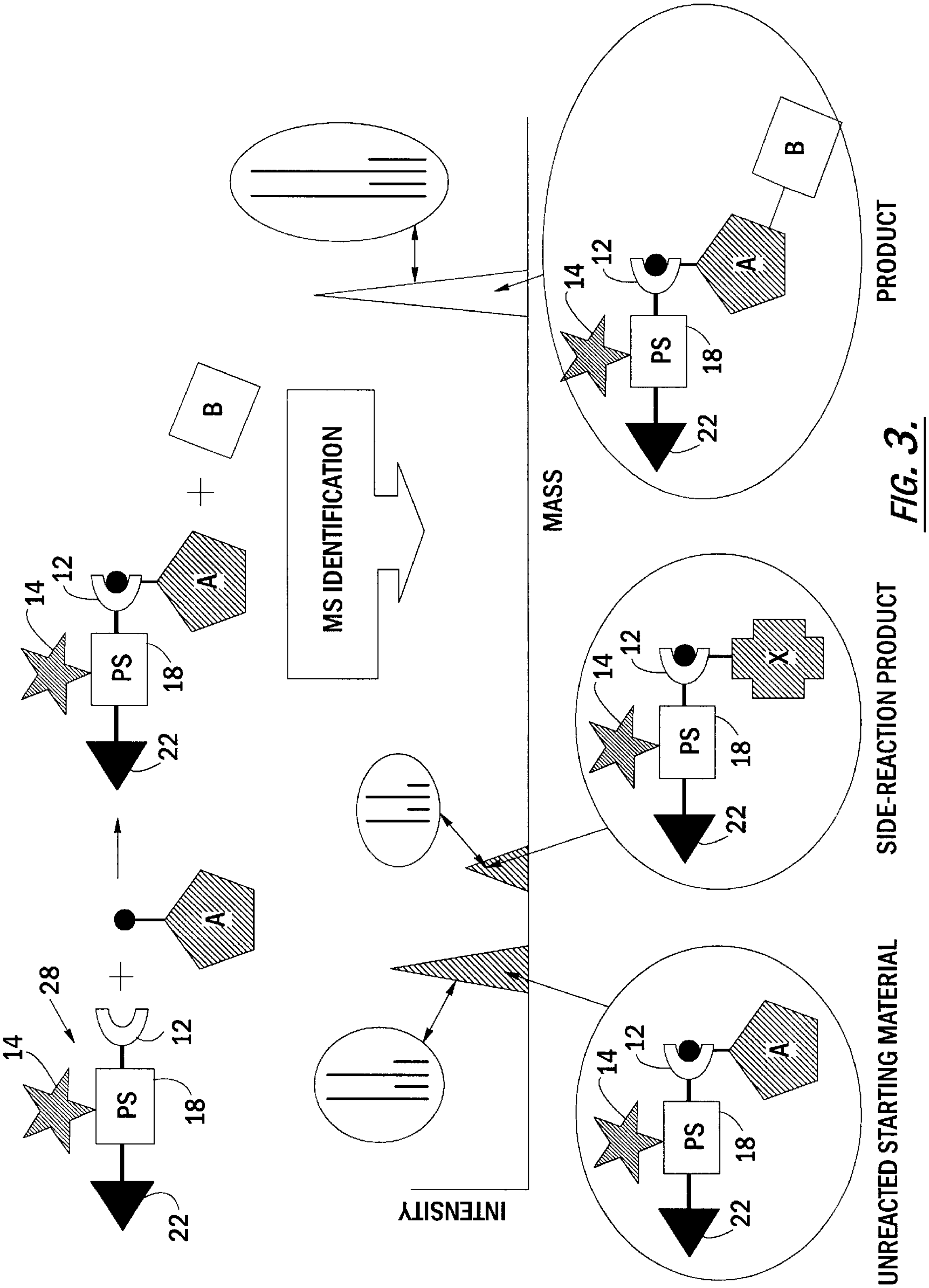
FIG. 3 illustrates one method for evaluating the results of a chemical process using mass spectroscopy using the module of FIG. 1*f*.

FIG. 3 illustrates a method for identifying the reaction product of a reaction, including any remaining starting materials and side reaction products. Conveniently, such a method may utilize module 28 of FIG. 1*f*. As shown, module 28 is reversibly attached to a chemical component A using attachment unit 12. Chemical component A is reacted with a chemical component B in solution. A sample of the solution is then placed in a mass spectrometer, such as a API 100, LC/MS system spectrometer, commercially available from Perkin-Elmer Sciex Instruments, Foster City, Calif., and any chemical components are identified using mass splitting unit 18. In so doing, it will be appreciated that separation unit 14 may not be needed. Mass splitting unit 18 may be used to identify the chemical components using techniques similar to those described in H. Mario Geysen, et al., "Isotope or Mass Encoding of Combinatorial Libraries," Chem. & Biol. Vol. III, No. 8, pp. 679–688, August 1996, and PCT International No. PCT/US97/05701, previously incorporated by reference. As shown, the chemical components identified are unreacted A, a side reaction product X, and the reaction product AB. Such a process may find use, for example, in confirming that the reaction produced a reaction product of interest. With such information, further processes may be used to separate the components and/or to quantify the yield of the reaction product.

Figure 4:
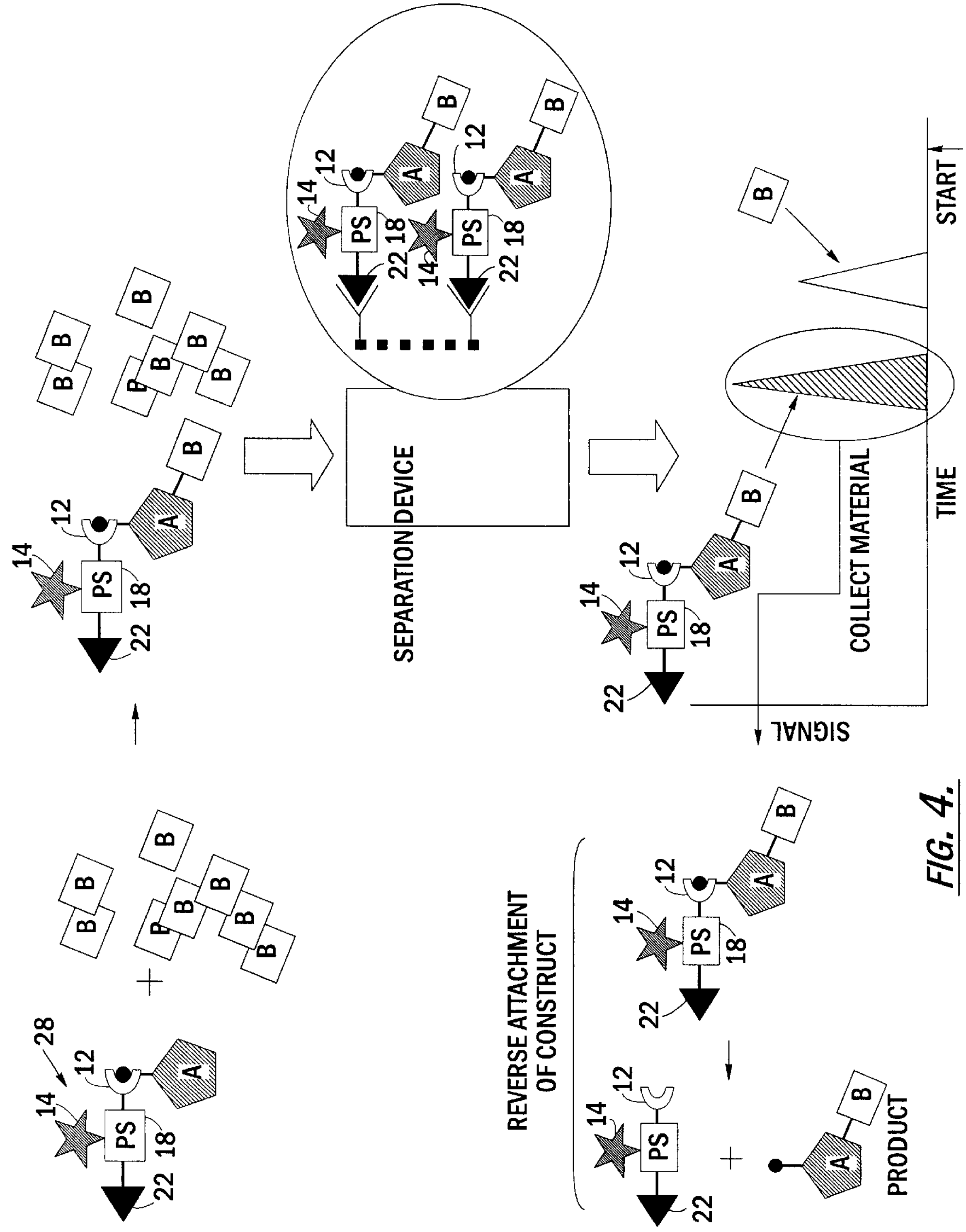
FIG. 4 illustrates a method for separating the results of a chemical process using a separation device along with the module of FIG. 1*f*.

One example of how to effect such separation is set forth in FIG. 4. As shown, module 28 that is attached to chemical component A is reacted with excess of chemical component B in solution. At least some of the solution is then placed into a separation device that has an affinity for separation unit 14. As the components exit the separation device, a detector is able to detect when unreacted B and reaction product AB exit the separation device. Based on the different dwell times, the components are separated. If desired, module 28 may be detached from reaction product AB using attachment unit 12.

Figure 5:
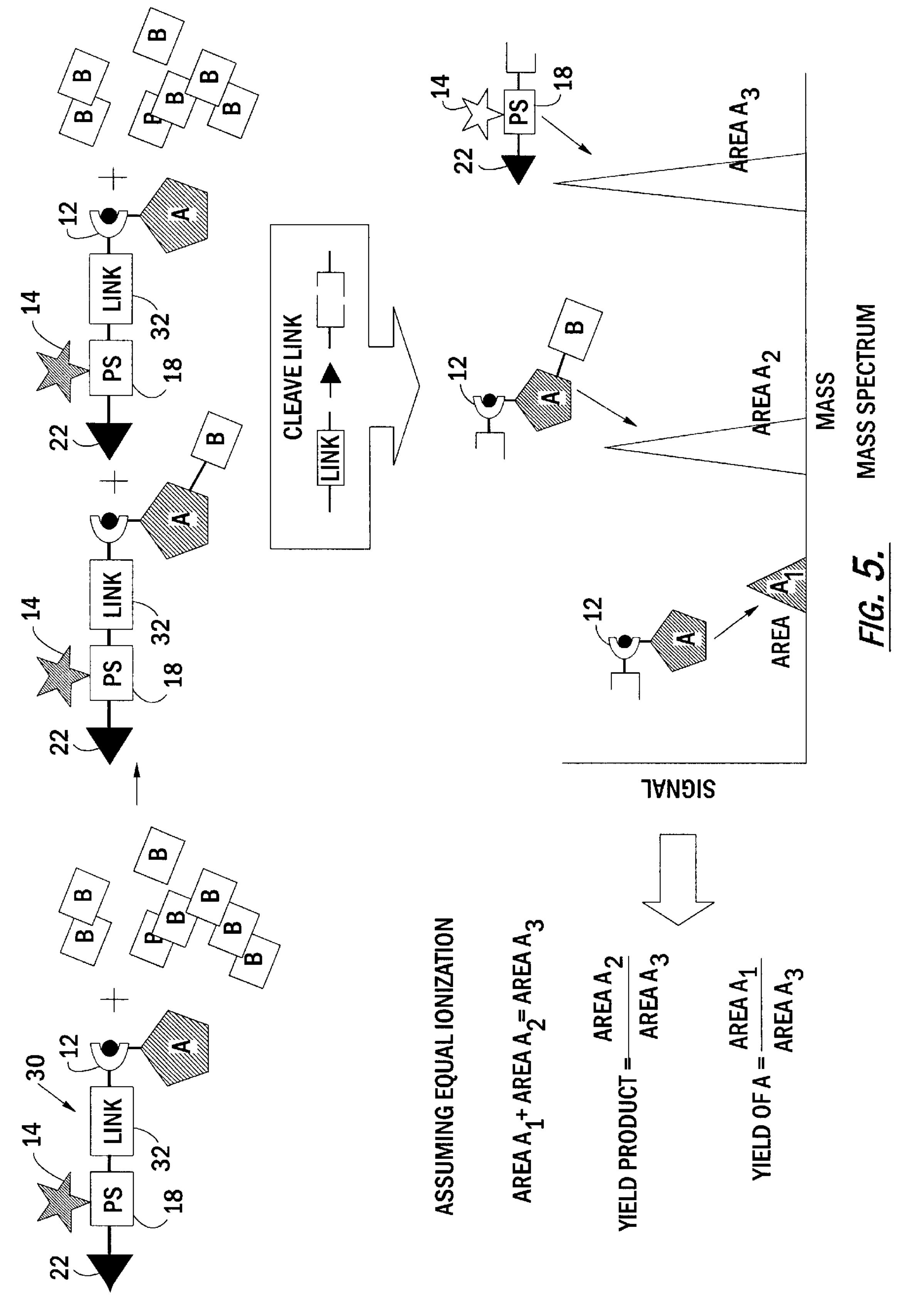
FIG. 5 illustrates a method for quantifying the results of a chemical reaction using mass spectroscopy using the module of FIG. 1*g*.

FIG. 5 illustrates a method for quantifying the results of a chemical process using module 30 of FIG. 1*g*. In the example of FIG. 5, module 30 is attached at site 12 to a chemical component A. Module 30 is then reacted with excess of a chemical component B. This results in constructs having module 30 with chemical component A, and module 30 with a reaction product AB. Excess of chemical component B is also present. Link 32 is then cleaved and a sample is placed into a mass spectrometer. Assuming equal ionization, area $A_1$+area $A_2$=area $A_3$. By utilizing link 32 as a reference material, the yield of the reaction product may be determined by dividing area $A_2$ by area $A_3$. Further, the yield of chemical component A may be calculated by dividing area $A_1$ by area $A_3$ using techniques described generally in copending U.S. patent application Ser. No. 09/625,781, filed on the same date as the present application, previously incorporated by reference.

The invention has now been described in detail for purposes of clarity of understanding. However, it will be appreciated that certain changes and modifications may be practiced within the scope of the appended claims.

What is claimed is:

1. A method for evaluating a reaction product contained in a solution, the method comprising:

reversibly attaching a module to a first chemical component, the module comprising a reversible attachment unit that reversibly attaches the module to the first chemical component and one or more attribute conferring units that are selected from a group consisting of separation attribute conferring units, identification attribute conferring units, and quantitation attribute conferring units;

reacting the first chemical component with at least a second chemical component to produce a reaction product;

separating the reaction product from any other components in the solution using the separation attribute conferring unit, identifying the reaction product using the identification attribute conferring unit, and/or quantifying the reaction product using the quantitation attribute conferring unit; and detaching the attachment unit from the reaction product without affecting or changing the reaction product.

2. A method as in claim 1, wherein the separating step comprises precipitating the reaction product in the solution, with separation attribute conferring unit permitting the reaction product to precipitate differentially from any other components in the solution.

3. A method as in claim 1, wherein the separating step comprises crystallizing the reaction product, with the separation attribute conferring unit permitting the reaction product to crystallize differentially from any other components in the solution.

4. A method as in claim 1, wherein the separating step comprises separating the reaction product using ion exchange chromatography with a charged separation attribute conferring unit.

5. A method as in claim 1, wherein the separating step comprises separating the product using size exclusion chromatography using a separation attribute conferring unit which makes the reaction product larger in size than the other components in the solution.

6. A method as in claim 1, wherein the separating step comprises reverse phase chromatography or normal phase chromatography by using a separation attribute conferring unit to enhance the differential interaction of the reaction product for a second phase with respect to other components in the solution.

7. A method as in claim 1, wherein the separating step comprises a phase separation procedure by using a separation attribute conferring unit to enhance the differential solubility of the reaction product for a second phase with respect to other components in the solution.

8. A method as in claim 1, wherein the separating step comprises providing the reaction product with a certain solubility using the separation attribute conferring unit, and separating the reaction product using reverse chromatography or normal phase chromatography.

9. A method as in claim 1, wherein the identifying step comprises ionizing the reaction product using a charged identification attribute conferring unit and placing a sample of the solution in a mass spectrometer.

10. A method as in claim 1, wherein the quantitation attribute conferring unit comprises an isotopic mass peak split signature and a reference material, and wherein the quantifying step comprises searching for the signature profile produced by the mass spectrometer and comparing a measured signal of the reference material with the reaction product to quantify the amount of the reaction product.

* * * * *

UNITED STATES PATENT AND TRADEMARK OFFICE
CERTIFICATE OF CORRECTION

PATENT NO. : 6,576,472 B1
DATED : June 10, 2003
INVENTOR(S) : Geysen

It is certified that error appears in the above-identified patent and that said Letters Patent is hereby corrected as shown below:

Title page,
Item [56], References Cited, FOREIGN PATENT DOCUMENTS, please add:
-- WO 97/42230
WO 99/41216
WO 00/12123
WO 00/20357 --.
OTHER PUBLICATIONS, please add:
-- Keating et al., "Postcondensation modifications of Ugi four-component condensation products: 1-isocyanocyclohexene as a convertible isocyanide. Mechanism of conversion, synthesis of diverse structures, and demonstration of resin capture"
J.Am. Chem. Soc. vol. 118(11):2574-2583 (1996). --.

Signed and Sealed this

Sixth Day of September, 2005

JON W. DUDAS
*Director of the United States Patent and Trademark Office*